United States Patent [19]

Tromborg

[11] Patent Number: 4,665,440

[45] Date of Patent: May 12, 1987

[54] PARALLEL PROCESSING OF THE OUTPUT FROM MONOLITHIC SENSOR ARRAYS

[75] Inventor: Erik T. Tromborg, Hennepin County, Minn.

[73] Assignee: Honeywell, Inc., Minneapolis, Minn.

[21] Appl. No.: 776,870

[22] Filed: Sep. 17, 1985

[51] Int. Cl.[4] .............................................. H04N 3/14
[52] U.S. Cl. ................................. 358/213.29; 358/294
[58] Field of Search ....................... 358/212, 213, 294; 357/24 LR

[56] References Cited

U.S. PATENT DOCUMENTS

| | | | |
|---|---|---|---|
| 3,904,818 | 9/1975 | Kovac | 358/213 |
| 4,237,383 | 12/1980 | Kosonocky et al. | 358/213 |
| 4,432,017 | 2/1984 | Stoffel et al. | 358/213 |
| 4,438,457 | 3/1984 | Tandon et al. | 358/213 |
| 4,513,313 | 4/1985 | Kinoshita et al. | 357/24 LR |
| 4,555,732 | 11/1985 | Tuhro | 358/213 |

Primary Examiner—Gene Z. Rubinson
Assistant Examiner—Stephen Brinich
Attorney, Agent, or Firm—C. Lamont Whitham

[57] ABSTRACT

A system is provided for increasing the operation speed of monolithic sensor arrays by segmenting the output circuitry to provide parallel outputs. Two approaches are described. One is an "on-chip" configuration, and the other, an "off-chip" configuration. In the first case, the transfer shift register (14) is divided into two or more segments, each segment serving a corresponding segment of the sensor array (10). By segmenting the transfer shift register, the transfer rate to parallel processors can be improved. In the off-chip approach, a system of gates (18) are provided to shift the contents of the on-chip transfer shift register (14) into a plurality of smaller shift registers (20), the contents of which are then transferred to multiple data processors.

5 Claims, 7 Drawing Figures

PARALLEL PROCESSING OF THE OUTPUT FROM MONOLITHIC SENSOR ARRAYS

DESCRIPTION

1. Field of the Invention

The present invention is generally directed to solid state imaging systems and, more particularly, to a technique for increasing the operational speed of monolithic sensor arrays by segmenting the output to provide parallel outputs.

2. Description of the Prior Art

Solid state imaging devices have been developed which have many advantages over earlier cathode ray vidicons and image orthicons. These devices are often implemented as charge coupled devices (CCDs) in which charges proportional to the energy of impinging photons are accumulated in energy wells and then read out by passing the charge from one energy well to another by means of appropriate control transfer pulses. The CCDs may be arranged in linear, or one dimensional, arrays or in area, or two dimensional, arrays. While solid state, monolithic image sensing arrays of this type have gained wide acceptance, there are factors which limit their performance. For example, the operation of such array sensors is limited by the rate at which the output data can be processed. In other instances, the rate at which the arrays can be used to sense the parameters of interest are limited by the rate at which data can be read out, rather than the intrinsic sensor properties.

Various techniques have been developed in the prior art which enhance the readout of monolithic sensor arrays such as arrays of CCDs. For example, U.S. Pat. No. 4,237,383 to Kosonocky et al discloses a technique for the high speed loading of the output register of a CCD array. The output register is loaded at high speed by first translating and temporarily storing groups of charges in a separate register. The temporarily stored groups of charges are then concurrently shifted and stored in parallel output registers. U.S. Pat. No. 4,432,017 to Stoffel et al and U.S. Pat. No. 4,438,457 to Tandon et al disclose sensor structures which include staggered arrays which are read out to two registers. The outputs of these registers are multiplexed to generate the output of the array. U.S. Pat. No. 3,824,846 to Snow discloses an example of a sensor array with two interlacing output registers for the purpose of achieving an increase in the scanning rate.

SUMMARY OF THE INVENTION

It is an object of the present invention to provide a technique for improving not only the rate at which data can be read out of a monolithic sensor array but also the rate at which the output data can be processed.

It is another object of the invention to provide a readout technique for monolithic sensor arrays which allows parallel processing of the output data to achieve faster and/or more complex processing of the output data.

It is a further object of the invention to provide a means by which lower cost, lower performance data processors may be utilized instead of a single high cost, high performance data processing system without, however, any sacrifice in the data processing rates.

According to the invention, the output circuitry of monolithic sensor arrays is segmented to provide a plurality of parallel outputs. This may be done in either of two ways. The first is an "on-chip" configuration, and the second is an "off-chip" approach. In the first case, the transfer shift register is divided into two or more segments, each segment serving a corresponding segment of the sensor array. By segmenting the transfer shift register, the transfer rate to parallel processors can be improved. In the second or "off-chip" approach, a system of gates are provided to shift the contents of the on-chip transfer shift register into a plurality of smaller shift registers, the contents of which are then transferred to multiple data processors.

The advantages of the "on-chip" approach are that the rates at which the monolithic sensor array can be utilized, with adequate sensor stimuli, can be extended in approximately direct proportion to the number of segments employed. Furthermore, for a given level of performance, multiple low speed data processors can be utilized instead of a single high speed processor. In a high performance imaging system, data handling rates and system performance can be greatly increased by the use of multiple high speed processors in direct proportion to the number of processors, provided sufficient sensor stimulus is available. Subdividing the processing load can permit more complex data processing to be accomplished.

Similar advantages obtain for the "off-chip" approach. Specifically, this approach provides a means for utilizing multiple processors to increase the limit of the data rates at which the sensor array can be utilized. It also provides a means by which lower cost, lower performance data processors may be utilized instead of a single high cost, high performance data processing system.

It is also possible to combine the segmentation scheme according to the invention with other data processing techniques to obtain still further advantages in performance. For example, the invention may be applied to an imaging array with two interlacing output registers by segmenting each of the output registers. Further, this may be done using either the "on-chip" or the "off-chip" approaches.

BRIEF DESCRIPTION OF THE DRAWINGS

The foregoing and other objects, aspects and advantages of the invention will be better understood by the following detailed description of the preferred embodiments of the invention with reference to the drawings, in which.

DETAILED DESCRIPTION OF THE PREFERRED EMBODIMENTS OF THE INVENTION

The invention will be described in terms of embodiments using linear, or one dimensional, imaging arrays for purposes of simplicity and clarity of explanation. However, those skilled in the art will understand that the invention may be applied to area, or two dimensional, arrays. The manner in which this is accomplished will be evident to those familiar with the technology.

Figure 1:
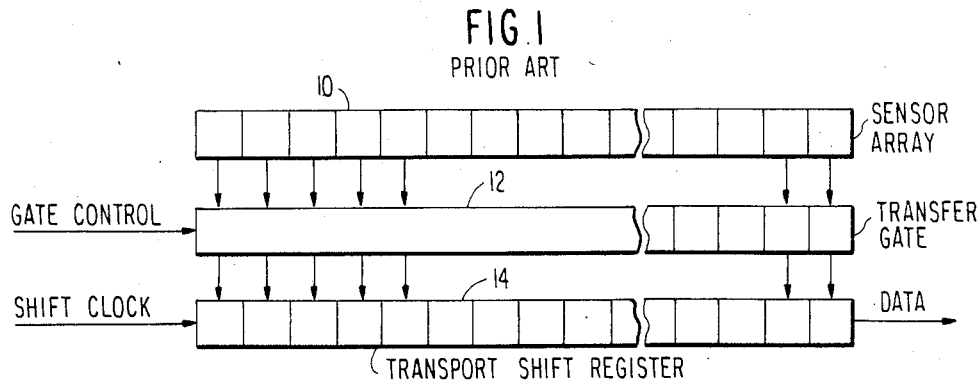
FIG. 1 is a schematic diagram showing a greatly simplified linear sensor array illustrating the principles of operation of a typical prior art monolithic sensor array.

Referring now to the drawings, and more particularly to FIG. 1, there is shown a greatly simplified linear sensor array 10. For example, the array 10 could be a 2048 element optical CCD array. In a typical cycle, the sensor array 10 responds to incoming optical energy, each element building up an electrical charge proportional to the total energy impinging on it. At the end of a predetermined time, a pulse to the transfer gate 12 results in the charges on the sensor array being transferred to corresponding sites on the transport shift register 14. On completion of the charge transfer, the sensor array 10 once again begins to integrate the energy impinging on it. Concurrently, the charges which were transferred to the transport shift register 14 are shifted out by appropriate control pulses. When all the charges have been shifted out in a serial manner, the shift register 14 is ready to accept the next transfer of charges from the sensor array 10.

As a consequence of this cycle, it is apparent that the cycle time is dependent on (1) the integration time, i.e., the time for the sensors to respond to the external stimuli, and (2) the readout time, i.e., the time required to shift out the data contained in the transport shift register. If integration time is long, as for low stimuli levels, there is ample time for the information in the transfer shift register 14 to be shifted out, and the transfer shift register can be set to accept a new set of charges from the sensor array 10. This mode of operation is typically characterized by low cycle repetition rates and permits relatively low data shift rates. If strong stimuli exist, or high cycle repetition rates are required for system performance, integration time must be short and the transport shift register operating rates must be kept high. Under these conditions, two situations are likely to occur:

1. The cycle time is limited by the time required to shift out data from the preceding cycle and clear the transport shift register.
2. The data rates required to clear the shift register exceed the capability of subsequent stages of signal and data processing equipment.

Figure 2:
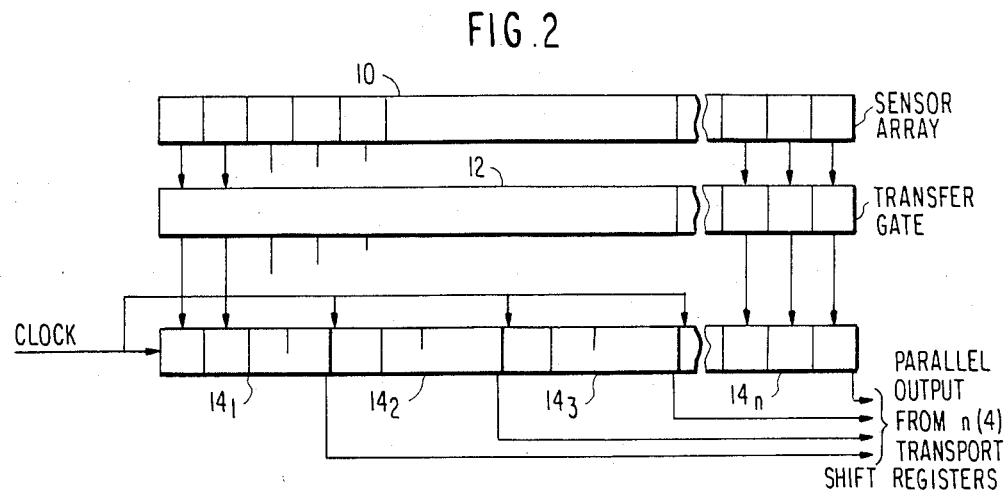
FIG. 2 is a schematic diagram illustrating the "on-chip" approach according to the present invention, this approach providing a plurality of parallel outputs from the monolithic array.

According to one embodiment of the present invention illustrated in FIG. 2 of the drawings, the transfer shift register is divided into two or more segments $14_1$ to $14_n$, each segment serving a corresponding segment of the sensor array. This provides parallel outputs from what may be viewed off-the-chip as a number of transport shift registers equal to the number of segments. Each of these outputs may then be supplied to a separate processor thereby overcoming the deficiencies noted above.

Figure 3A:
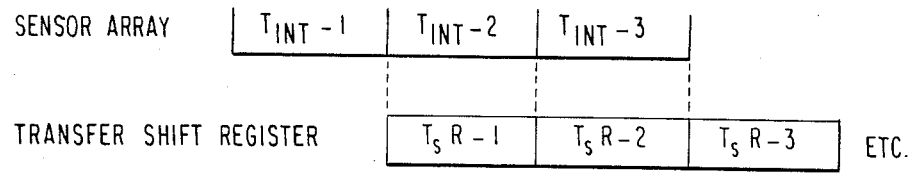
FIGS. 3A, 3B and 3C are block diagrams illustrating the principles of operation of the prior art sensor array shown in FIG. 1 and those of the invention as shown in FIG. 2.
Figure 3B:
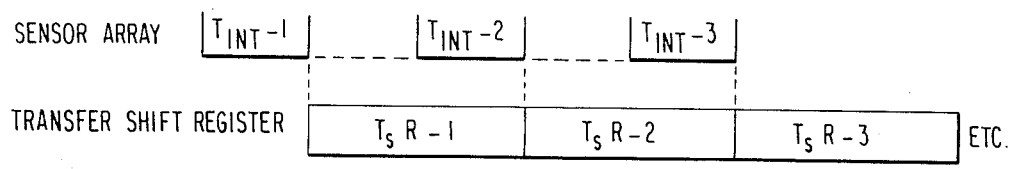
Figure 3C:
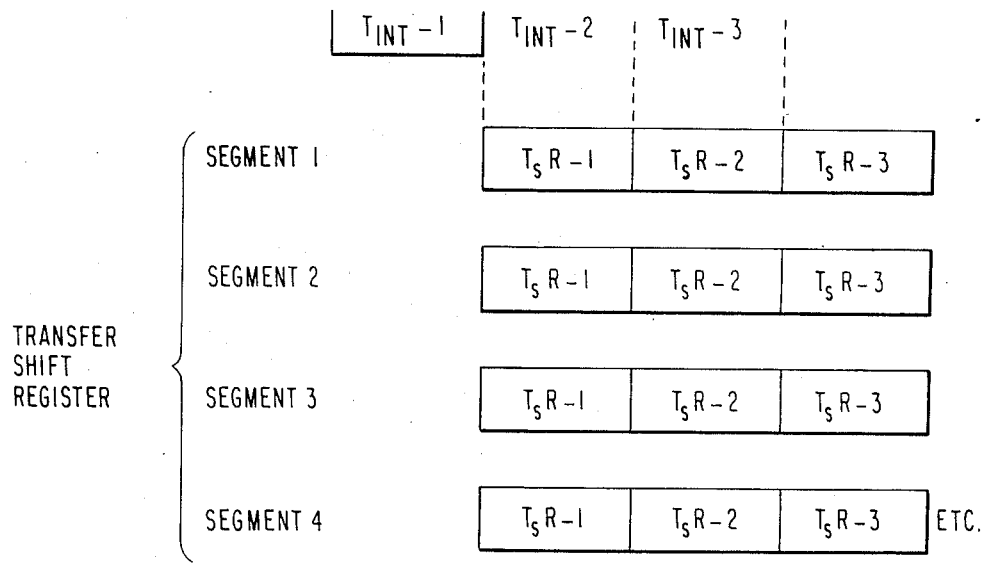

The effect of the approach according to the invention is illustrated in the following example. Assume a linear CCD optical array of 2048 elements having a transfer shift register clock rate of one megaHertz and an array integration time ($T_{INT}$) which can be set independently of the cycle time. For low stimuli levels and a long integration time, the sensor response for the interval $T_{INT}-1$ is transferred to the transfer shift register and shifted out in the time $T_sR-1$ as diagrammed in FIG 3A, where $T_sR$ is the transfer rate of a segment of the transfer shift register. Hence, the time of a cycle T is give below as $$T \simeq T_{INT} \gtrsim T_sR,$$

and in a specific example, $$T_sR = 2,048/1,000,000 = 2.048 \text{ milliseconds}$$

and the repetition rate is 1/T cycle = 488 cycles (lines)/second. For high stimuli levels, shorter $T_{INT}$ would be possible, but the cycle time is limited by $T_sR$ as shown by FIG. 3B. Although $T_{INT}$ is significantly less than $T_sR$, $T \simeq T_sR$, or is again 2.048 milliseconds, and the repetition rate is 488 cycles (lines)/second. The result of dividing the transfer shift register into n segments is illustrated in FIG. 3C, where n=4. The contents of each segment of the sensor array are transferred simultaneously to their corresponding segments in the transfer shift register, and these segments are arranged so that their contents are shifted out in parallel. Thus, $$T = (TsR/n) = (TsR/4), \text{ or}$$

$$T = (2048/10^6/4) = 0.512 \text{ milliseconds},$$

and the repitition rate is increased to 1952 cycles/second, in proportion to the number of segments incorporated in the transfer shift register.

It can be easily shown that segmenting the transfer shift register in the manner described can be used to increase the transfer rate or reduce the transfer time to parallel processors for a given level of performance. In this way, the capability of a system with a single conventional sensor array working with a data processing system capable of one megaHertz input rates could be upgraded to work at, for example, four megaHertz using four data processors, or at one megaHertz using much less expensive data processors working at only 250 kiloHertz.

Figure 4:
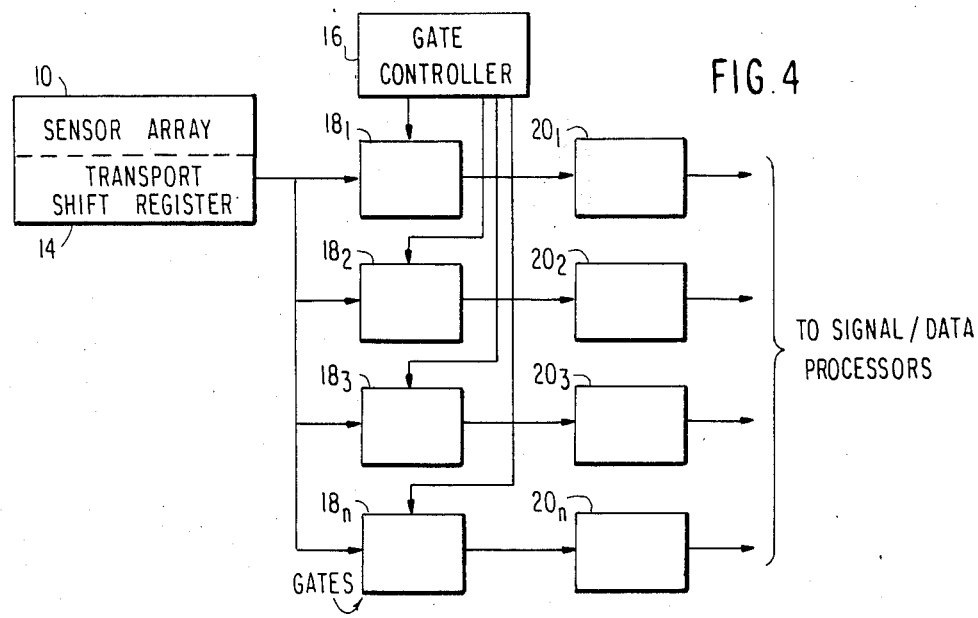
FIG. 4 is a block diagram illustrating the "off-chip" approach according to the present invention, this approach dividing the output of the array into a plurality of parallel outputs.

In many situations, the data rates at which a sensor array can perform is limited by the rate at which a data processing system can operate. Alternatively, it may be advantageous to employ multiple low cost, low performance data processors as compared to a single high cost, high performance data processor. This approach is particularly advantageous when used with the "off-chip" embodiment of the invention illustrated in FIG. 4 of the drawings. Again, the example of a 2048 element linear CCD array with a transfer shift register transferring data out at the rate of four megaHertz is used. In this case, subsequent data processing can be accomplished at a maximum rate of one megaHertz. By providing a system of gates $18_1$ to $18_n$ and registers $20_1$ to $20_n$ and a gate controller 16, the contents of the on-chip transfer shift register 14 can be shifted into four smaller off-chip shift registers. The first 512 data points are loaded in register $20_1$, the next 512 data points are loaded in register $20_2$, and so on. The contents of these registers can then be transferred to multiple data processors at one fourth the data rate from the sensor array transfer register. This approach to buffering the output data can be used to remove the limitation of data processing systems where the sensor array is capable of high speed performance.

Figure 5:
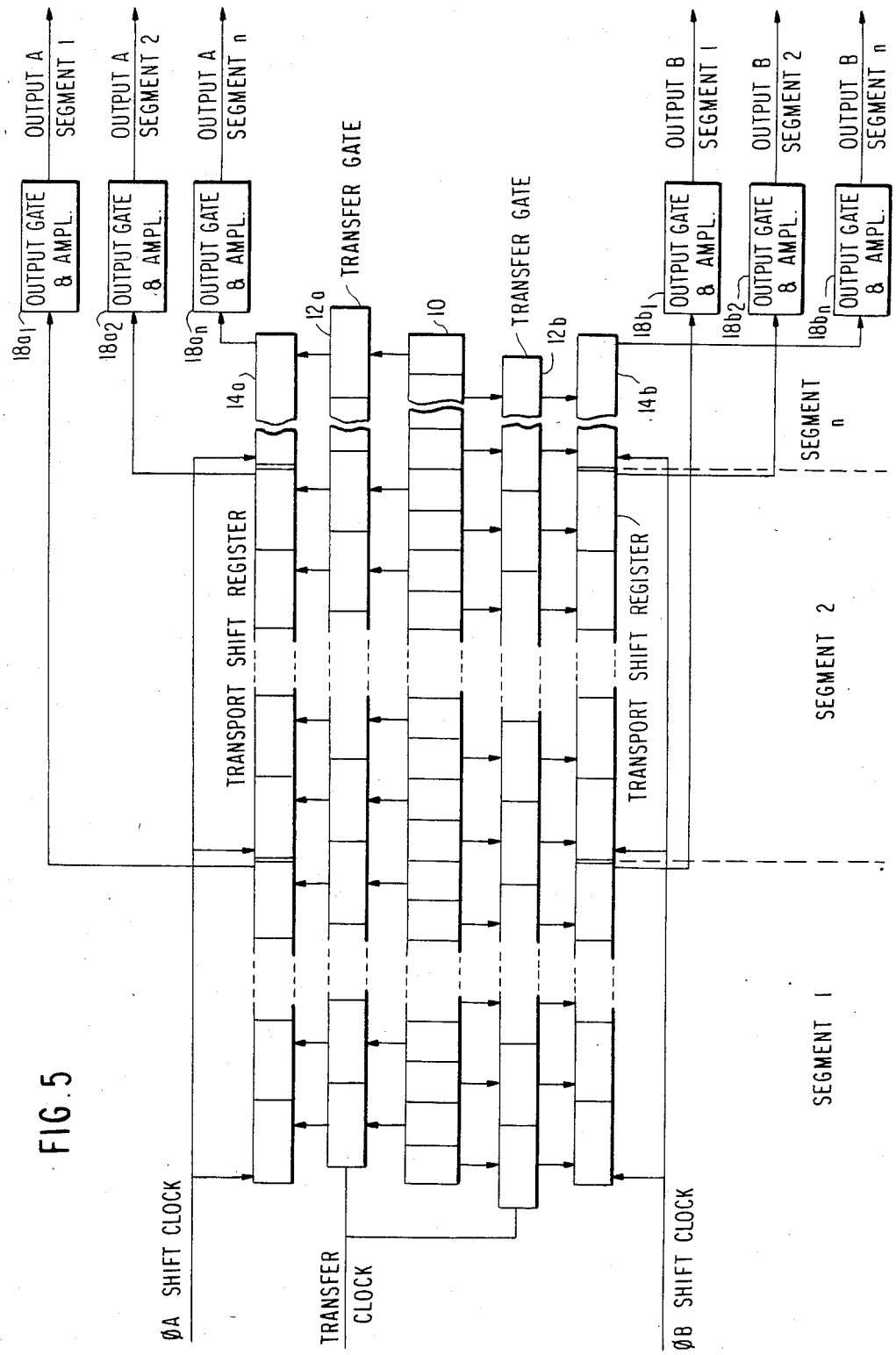
FIG. 5 is a schematic and block diagram illustrating the application of the invention to an imaging sensor array with two segmented interlacing output registers.

The invention can also be advantageously combined with other data handling techniques as shown, for example, in FIG. 5. In this case, the sensor array 10 is provided with two interlacing output registers as described in U.S. Pat. No. 3,814,846 to Snow. More specifically, alternate elements of the sensor array 10 are connected by transfer gates 12A and 12B to transfer shift registers 14A and 14B. The shift registers 14A and 14B are in turn divided into segments according to the principles of the present invention. Thus, shift register 14A is divided into segments $14A_1$ to $14A_n$, and shift register 14B is divided into segments $14B_1$ to $14B_n$. Each of these segments is connected via output gates $18A_1$ to $18A_n$ and $18B_1$ to $18B_n$, respectively, to a corresponding parallel processor.

Although the examples described have been based on using linear CCD arrays, the approaches described can be used with linear or area arrays where data is shifted out in a sequential data stream. Therefore, while the invention has been described in terms of three preferred embodiments, modifications and changes can be made without departing from the scope and spirit of the invention.

Having thus described my invention, what I claim and desire to protect and secure by Letters Patent is as follows:

1. A system for parallel processing of the output from a monolithic image sensor array fabricated on a single semiconductor chip, said array comprising one or more linear arrays of image sensors, said system comprising:

transfer gate means on said chip and connected to said image sensor array for transferring image point data from said array;

a plurality of shift register means for each of said linear arrays of image sensors connected to said transfer gate means for receiving different segments of data from said transfer gate means; and a plurality of processor means, each connected to a corresponding one of said plurality of shift register means, for processing said different segments of data in parallel.

2. The system recited in claim 1 wherein said plurality of shift register means is on said chip and comprises a transfer shift register segmented to form a plurality of transfer shift registers, each of said plurality of transfer shift registers providing a serial output in parallel with the outputs of the other transfer shift registers.

3. The system recited in claim 1 wherein said plurality of shift register means comprises:

a transfer shift register on said chip;

a plurality of shift registers off said chip; and gate means connected between said transfer shift register and said plurality of off chip shift registers for transferring different segments of the data read out of said transfer shift register into different ones of said plurality of off chip shift registers.

4. The system recited in claim 1 wherein said plurality of processor means have an operating speed measured in cycles per second approximately equal to the cycle time of said one or more linear arrays.

5. The system recited in claim 1 wherein said plurality of processor means have an operating speed measured in cycles per second which is 1/n that of the cycle time of said one or more linear arrays, where n is the number of said processor means.

* * * * *